US009023513B2

(12) United States Patent
Lee et al.

(10) Patent No.: US 9,023,513 B2
(45) Date of Patent: *May 5, 2015

(54) RECHARGEABLE SECONDARY BATTERY HAVING IMPROVED SAFETY AGAINST PUNCTURE AND COLLAPSE

(75) Inventors: Donghyun Lee, Suwon-si (KR); Jeongwon Oh, Suwon-si (KR); Heungtaek Shim, Suwon-si (KR); Yoontai Kwak, Suwon-si (KR)

(73) Assignees: Samsung SDI Co., Ltd., Yongin-si (KR); Robert Bosch Gmbh, Stuttgart (DE)

( * ) Notice: Subject to any disclaimer, the term of this patent is extended or adjusted under 35 U.S.C. 154(b) by 149 days.

This patent is subject to a terminal disclaimer.

(21) Appl. No.: 12/610,210

(22) Filed: Oct. 30, 2009

(65) Prior Publication Data

US 2010/0279170 A1 Nov. 4, 2010

Related U.S. Application Data

(60) Provisional application No. 61/237,583, filed on Aug. 27, 2009.

(51) Int. Cl.
  *H01M 10/02* (2006.01)
  *H01M 10/0525* (2010.01)
  *H01M 10/0587* (2010.01)
  (Continued)

(52) U.S. Cl.
  CPC .............. *H01M 2/263* (2013.01); *H01M 2/34* (2013.01); *H01M 2/348* (2013.01); *H01M 10/0525* (2013.01); *H01M 10/0587* (2013.01)

(58) Field of Classification Search
  USPC ................... 429/94, 122–123, 128–145, 149, 429/152–155, 246
  See application file for complete search history.

(56) References Cited

U.S. PATENT DOCUMENTS 5,326,653 A * 7/1994 Chang ........................... 429/162
5,534,369 A * 7/1996 Nagaura ........................ 429/161
(Continued)

FOREIGN PATENT DOCUMENTS

EP    0 780 920 A1    6/1997
EP    2 048 736 A1    4/2009
(Continued)

OTHER PUBLICATIONS

Communication with European Search Report for Application No. EP 10 16 5968, date of mailing Sep. 2, 2010, 7 pages.
(Continued)

*Primary Examiner* — Jonathan Crepeau
*Assistant Examiner* — Jacob Buchanan
(74) *Attorney, Agent, or Firm* — Christie, Parker & Hale, LLP

(57) ABSTRACT

A rechargeable battery having improved safety against puncture and collapse includes an electrode assembly, a case, a first electrode terminal and a second electrode terminal, a cap plate, and a short circuit member. The electrode assembly includes a first electrode, a separator, and a second electrode. The case contains the electrode assembly. The first electrode terminal and a second electrode terminal are electrically connected to the first electrode and the second electrode, respectively. The short circuit member is between the electrode assembly and the case and short circuits the secondary battery when the secondary battery is punctured or collapsed.

19 Claims, 10 Drawing Sheets

(51) Int. Cl.
*H01M 2/02* (2006.01)
*H01M 2/26* (2006.01)
*H01M 2/34* (2006.01)

(56) References Cited

U.S. PATENT DOCUMENTS

| | | | |
|---|---|---|---|
| 5,800,937 | A | 9/1998 | Decker et al. |
| 5,824,120 | A * | 10/1998 | Mitchell et al. ............. 29/623.1 |
| 5,989,743 | A * | 11/1999 | Yamashita .................... 429/129 |
| 6,342,826 | B1 | 1/2002 | Quinn et al. |
| 7,060,388 | B2 * | 6/2006 | Naruoka ....................... 429/161 |
| 8,039,147 | B2 * | 10/2011 | Lee et al. ..................... 429/164 |
| 2002/0034685 | A1 | 3/2002 | Sato et al. |
| 2003/0044677 | A1 | 3/2003 | Naruoka |
| 2003/0129479 | A1 | 7/2003 | Munenaga et al. |
| 2004/0265700 | A1 * | 12/2004 | Ugawa et al. ................. 429/331 |
| 2005/0118499 | A1 * | 6/2005 | Kim ............................... 429/129 |
| 2005/0287431 | A1 * | 12/2005 | Cho ............................... 429/161 |
| 2006/0051667 | A1 | 3/2006 | Kim |
| 2006/0121341 | A1 | 6/2006 | Hosoda et al. |
| 2006/0257724 | A1 * | 11/2006 | Kwon et al. .................... 429/65 |
| 2007/0166605 | A1 | 7/2007 | Meguro et al. |
| 2007/0224496 | A1 | 9/2007 | Woo |
| 2007/0254212 | A1 * | 11/2007 | Viavattine .................... 429/164 |
| 2009/0092889 | A1 | 4/2009 | Hwang et al. |
| 2009/0317665 | A1 | 12/2009 | Maeng et al. |
| 2010/0279160 | A1 | 11/2010 | Lee et al. |

FOREIGN PATENT DOCUMENTS

| | | |
|---|---|---|
| JP | 08-153542 | 6/1996 |
| JP | 10-326610 A | 12/1998 |
| JP | 11-86844 | 3/1999 |
| JP | 2001-524255 | 11/2001 |
| JP | 2002-093402 | 3/2002 |
| JP | 2003-142068 | 5/2003 |
| JP | 2006-222077 | 8/2006 |
| JP | 2007-214106 | 8/2007 |
| JP | 2008-41264 | 2/2008 |
| JP | 2008-130458 | 6/2008 |
| JP | 2009-94068 A | 4/2009 |
| JP | 2010-003690 | 1/2010 |
| JP | 2011-049147 A | 3/2011 |
| KR | 2002-0018961 | 3/2002 |
| KR | 2004-0079316 | 9/2004 |
| KR | 10-0875607 | 12/2008 |
| KR | 10-0876268 B1 | 12/2008 |
| KR | 10-0905390 | 6/2009 |
| KR | 10-2009-0132926 | 12/2009 |

OTHER PUBLICATIONS

KIPO Office Action dated Jul. 29, 2011 for corresponding Korean Patent Application 10-2009-0115134, 5 pages.
Patent Abstract of Japan and English Machine Translation of Japan Publication No. JP 2003-142068 listed above, 10 pages.
Patent Abstract of Japan, and English machine translation of Japanese Publication 08-153542, listed above, 30 pages.
Patent Abstract of Japan, and English machine translation of Japanese Publication 11-086844, listed above, 35 pages.
Patent Abstract of Japan, and English machine translation of Japanese Patent 10-326610, listed above, 45 pages.
English machine translation of Japanese Publication 2002-093402, listed above, 14 pages.
Patent Abstract of Japan, and English machine translation of Japanese Publication 2006-222077, listed above, 25 pages.
Patent Abstract of Japan, and English machine translation of Japanese Publication 2008-41264, listed above, 69 pages.
European Search Report dated Oct. 15, 2010 for European Patent application 10168818.2, 6 pages.
European Search Report dated Apr. 21, 2011 for European Patent application 10168818.2, 6 pages.
European Search Report dated Sep. 2, 2010 for European Patent application 10165931.6, 6 pages.
U.S. Office action dated Oct. 26, 2011, for cross reference U.S. Appl. No. 12/856,933, 23 pages.
U.S. Office action dated Feb. 15, 2012, for cross reference U.S. Appl. No. 12/856,933, 16 pages.
U.S. Office action dated Aug. 23, 2010, for cross reference U.S. Appl. No. 12/610,214 (now U.S. Patent 8,039,147), 9 pages.
U.S. Office action dated Dec. 1, 2010, for cross reference U.S. Appl. No. 12/610,214 (now U.S. Patent 8,039,147), 10 pages.
U.S. Office action dated Mar. 31, 2011, for cross reference U.S. Appl. No. 12/610,214 (now U.S. Patent 8,039,147), 11 pages.
U.S. Notice of Allowance dated Jul. 22, 2011, for cross reference U.S. Appl. No. 12/610,214 (now U.S. Patent 8,039,147), 9 pages.
Patent Abstracts of Japan, and English machine translation of Japanese Publication 2008-130458 listed above, (56 pages).

* cited by examiner

RECHARGEABLE SECONDARY BATTERY HAVING IMPROVED SAFETY AGAINST PUNCTURE AND COLLAPSE

CROSS REFERENCE TO RELATED APPLICATION

This application claims priority to and the benefit of U.S. Provisional Patent Application No. 61/237,583, filed on Aug. 27, 2009 in the United States Patent and Trademark Office, the entire content of which is incorporated herein by reference.

BACKGROUND

1. Field

The following description relates to a rechargeable secondary battery, and more particularly to a rechargeable secondary battery with improved safety against puncture and collapse.

2. Description of Related Art

Lithium ion secondary batteries are widely used as a power source for small electronic devices such as notebook computers and cellular phones. In addition, because lithium ion secondary batteries have high output density, high capacity, and are light weight, they are also being used in hybrid and electric automobiles.

Lithium ion secondary batteries used as a power source of automobiles should satisfy safety and reliability requirements under severe conditions. There are a plurality of test categories for safety, among which, three of the most extreme test categories include puncture, collapse, and overcharge.

The puncture and collapse tests are performed to estimate secondary battery related damage in the event of a car accident and thus are very important test categories for safety. Specifically, in nail puncture tests, such as a nail penetration test, and collapse tests, the battery should not excessively increase in temperature after puncture or collapse.

SUMMARY

Aspects of embodiments of the present invention are directed toward a rechargeable secondary battery having improved safety against puncture and collapse.

A rechargeable battery according to an exemplary embodiment of the present invention includes a first electrode, a second electrode, and a separator between the first electrode and the second electrode. A rechargeable battery may include a case containing the electrode assembly and a cap plate combined to the case. A rechargeable battery may include a short circuit member separate from the first and second electrodes, wound around the electrode assembly, and electrically connected to at least one of the first electrode or the second electrode.

A first end of the short circuit member may overlap a second end of the short circuit member. The short circuit member may be wound around the electrode assembly up to seven times.

A rechargeable battery may include a second electrode assembly, and the short circuit member may include a first short circuit member wound around the electrode assembly and a second short circuit member wound around the second electrode assembly.

A rechargeable battery may include a second electrode assembly, and the short circuit member may be integrally wound around all the electrode assemblies.

A rechargeable battery may have a short circuit member including a first metal plate, a second metal plate, a film between the first metal plate and the second metal plate. The rechargeable battery may be configured to short circuit the electrode assembly when the battery is punctured or collapsed by electrically connecting the first metal plate and the second metal plate.

The first metal plate may be adjacent to the electrode assembly and the second metal plate may be adjacent to the case. The short circuit member may include a second film between the second metal plate and the case.

The first metal plate of the short circuit member may be electrically connected to the first electrode and the second metal plate may be electrically connected to the second electrode.

The first electrode may comprise a metal foil and the first metal plate and the second metal plate may include the same material as the metal foil.

A resistivity of the first metal plate and a resistivity of the second metal plate may be lower than that of an active material of the first electrode or that of an active material of the second electrode.

The first metal plate and the second metal plate may be formed of copper.

The first metal plate may be formed of aluminum and the second metal plate may be formed of copper.

The first metal plate and the second metal plate may be formed of a different material than that of the case.

The first metal plate and the second metal plate may each have a thickness of between about 100 μm and about 200 μm.

The first metal plate and the second metal plate of the short circuit member may each have either a single-layered or multi-layered structure.

The first electrode may include a first metal foil and the second electrode may include a second metal foil. The first metal plate and the second metal plate of the short circuit member may each have a thickness greater than that of the first metal foil or the second metal foil.

The first electrode may include a first uncoated region extending to a first side of the electrode assembly and the second electrode may include a second uncoated region extending to a second side of the electrode assembly. The first metal plate of the short circuit member may be electrically connected to the first uncoated region, and the second metal plate of the short circuit member may be electrically connected to the second uncoated region.

The first metal plate and the first uncoated region may be welded to each other, and the second metal plate and the second uncoated region may be welded to each other.

The rechargeable battery may include a first electrode terminal and a second electrode terminal, and the first terminal, first metal plate, and the first uncoated region may be welded to each other, and the second terminal, second metal plate, and second uncoated region may be welded to each other.

DESCRIPTION OF REFERENCE NUMERALS INDICATING SOME ELEMENTS IN THE DRAWINGS

| | |
|---|---|
| 100: Secondary battery | |
| 110: Electrode assembly | 111: First electrode |
| 111a: First metal foil | 111b: First active material |
| 111c: First uncoated region | 112: Second electrode |
| 112a: Second metal foil | 112b: Second active material |
| 112c: Second uncoated region | 113a, 113b: Separators |
| 120: Case | 121a, 121b: Wide lateral surface |
| 122a, 122b: narrow lateral surface | 123: Bottom surface |
| 130: First electrode terminal | 131: Welding region |
| 132: First extension | 133: Second extension |
| 134: Bolt extension | 135: Nut |
| 140: Second electrode terminal | 141: Welding region |
| 142: First extension | 143: Second extension |
| 144: Bolt extension | 150: Cap plate |
| 151a, 151b: Insulating material | 152: Electrolyte plug |
| 153: Safety vent | 160: Short circuit member |
| 161: First metal plate | 162: First film |
| 163: Second metal plate | 164: Second film |
| 160a, 160b, 160c, 160d, 160e, 160f: Welding mark | |

DETAILED DESCRIPTION

Exemplary embodiments will now be described more fully with reference to the accompanying drawings; however, they may be embodied in different forms and should not be construed as limited to the embodiments set forth herein. Rather, these embodiments are provided so that the disclosure is thorough and complete, and will fully convey the scope of the invention to those skilled in the art.

In rechargeable secondary batteries according to embodiments of the present invention, because the short circuit member is between the electrode assembly and the case, the short circuit member causes a short circuit when the secondary battery is punctured or collapsed. Since the short circuit member has low resistivity, little heat is generated, and a large amount of current is quickly consumed when the short circuit induces a short circuit. Therefore, as little heat is generated when secondary batteries according to embodiments of the present invention are punctured or collapsed, the safety and reliability of secondary batteries are both significantly improved.

Figure 1A:
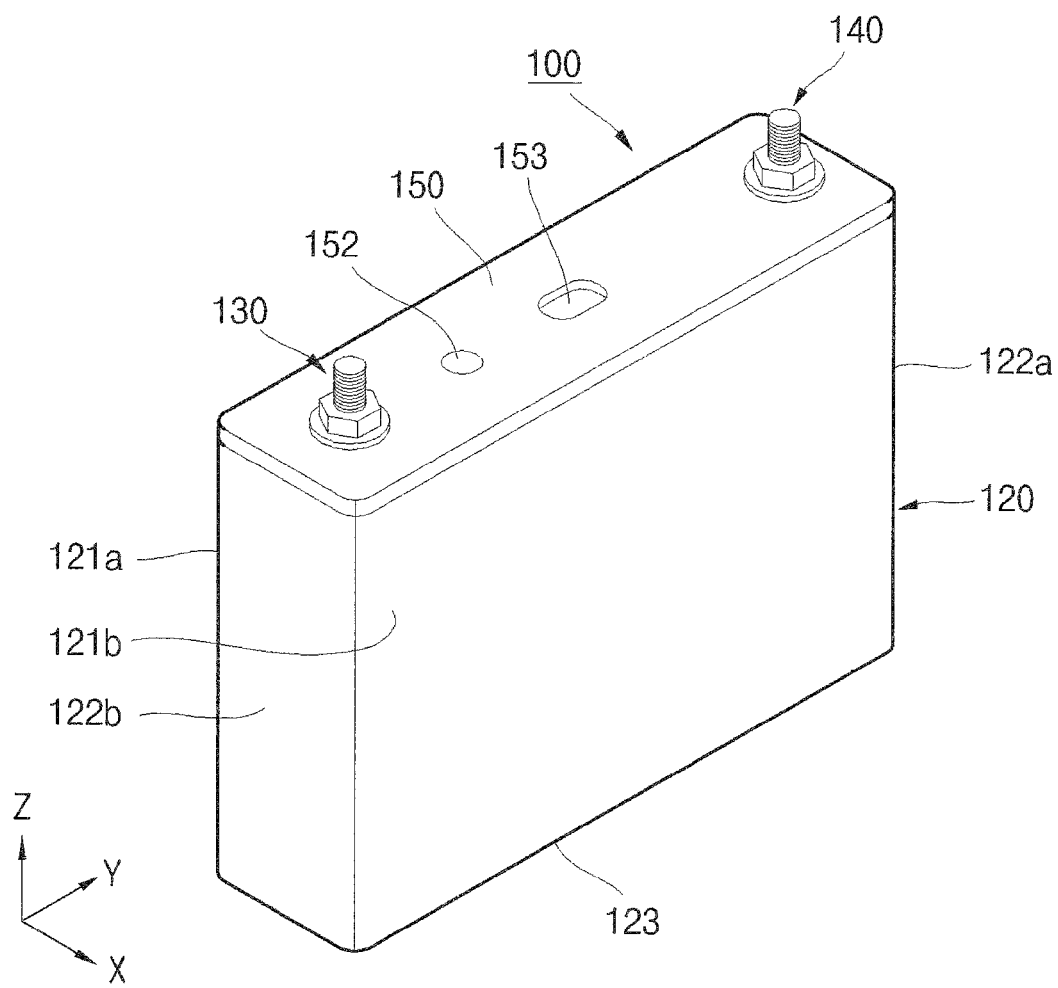
FIG. 1A is a perspective view of a secondary battery according to a first exemplary embodiment of the present invention.
Figure 1B:
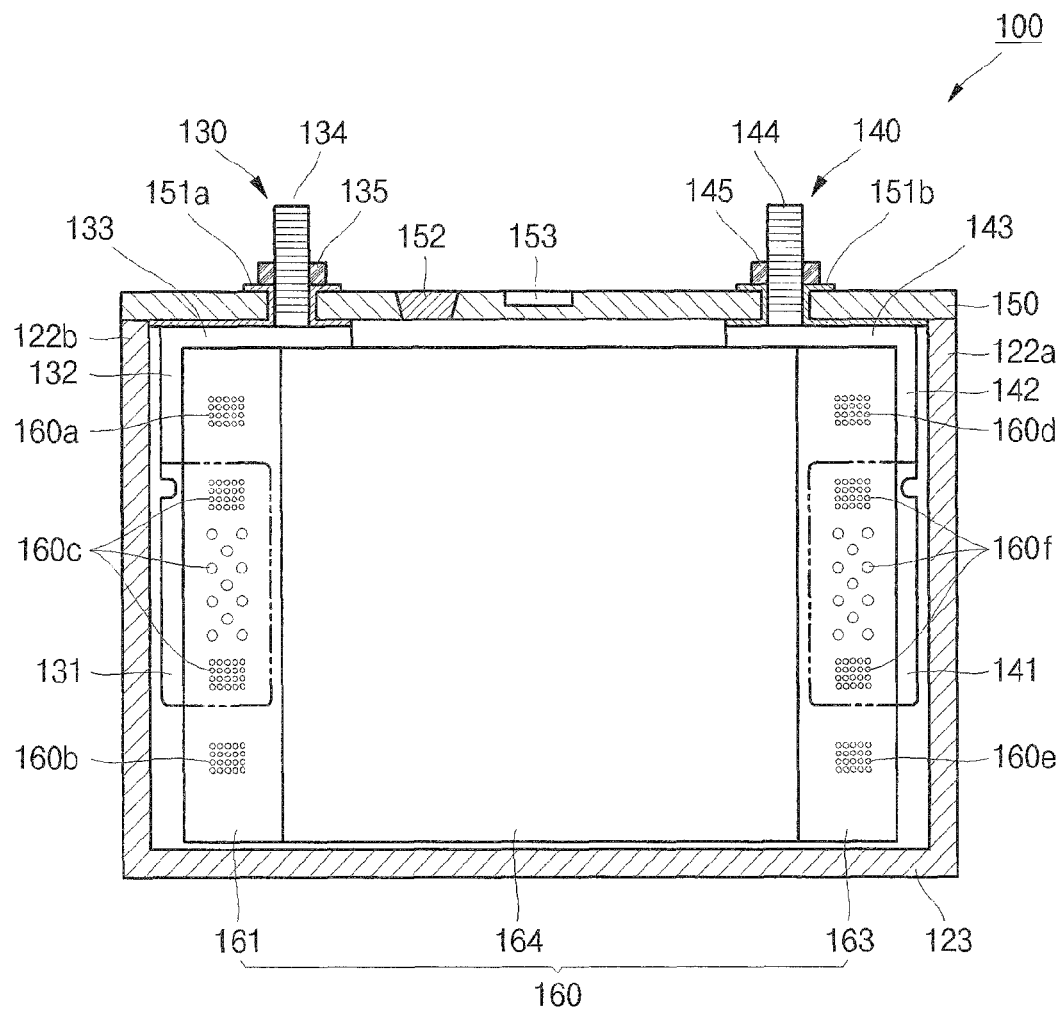
FIG. 1B is a cross-sectional view of FIG. 1A.
Figure 1C:
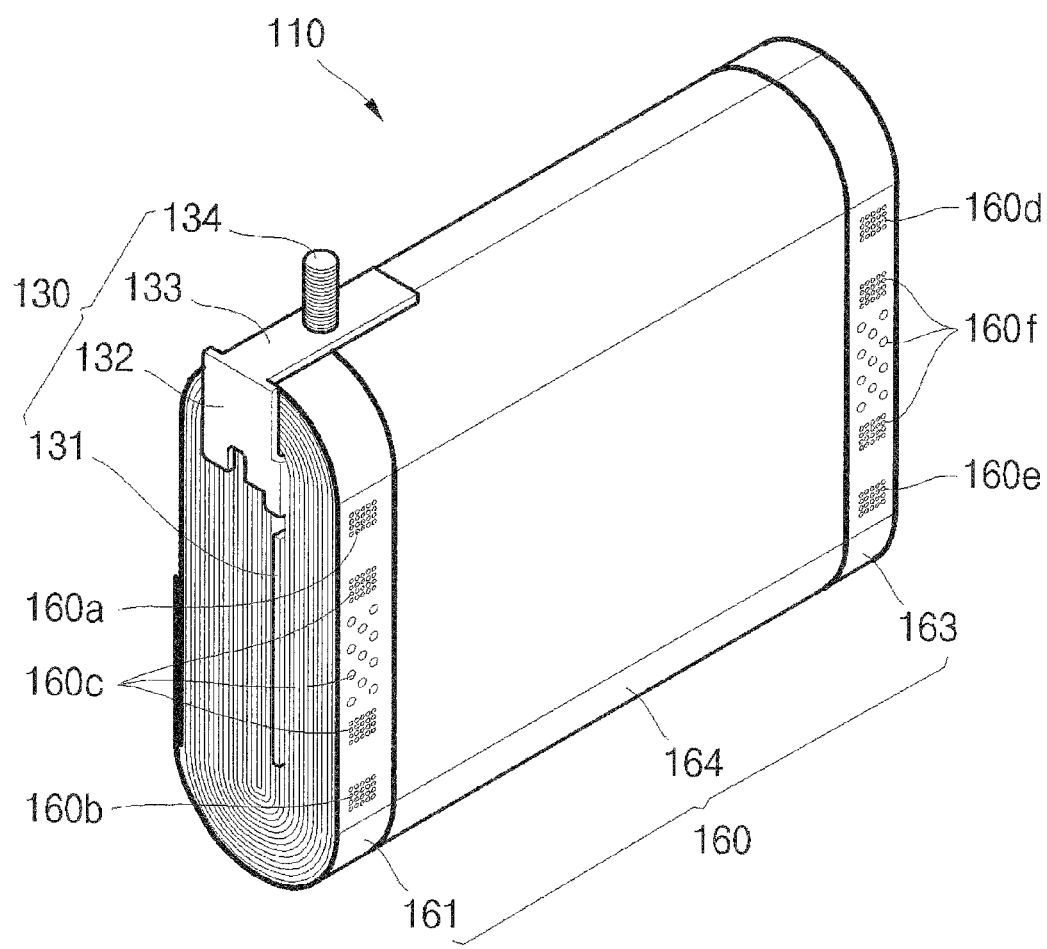
FIG. 1C is a perspective view of an electrode assembly and electrode terminal according to the first exemplary embodiment of the present invention.

FIG. 1A is a perspective view of a secondary battery according to a first exemplary embodiment of the present invention, FIG. 1B is a cross-sectional view of the secondary battery of FIG. 1A, and FIG. 1C is a perspective view of an electrode assembly and an electrode terminal of the secondary battery of FIG. 1A.

FIG. 1A depicts a secondary battery 100 having improved safety against puncture and collapse according to the first exemplary embodiment of the present invention. The secondary battery includes an electrode assembly 110, a can 120, a first electrode terminal 130, a second electrode terminal 140, a cap plate 150, and a short circuit member 160. In some embodiments, the can 120 is referred to as a case.

The electrode assembly 110 includes a first electrode, a separator, and a second electrode. The wound electrode assembly 110 has a jelly roll shape. The first electrode may be a positive electrode, and the second electrode may be a negative electrode. Alternatively, the first electrode may be a negative electrode, and the second electrode may be a positive electrode. The first electrode includes a first metal foil and a first active material. When the first electrode is the positive electrode, the first metal foil may be formed of aluminum, and the first active material may include lithium based oxide. The second electrode also includes a second metal foil and a second active material. When the second electrode is the negative electrode plate, the second metal foil may be formed of copper, and the second active material may include graphite. However, embodiments of the present invention are not limited to these materials. The separator may be formed of porous polyethylene (PE), polypropylene (PP), or other equivalents. The separator may be on both upper and lower surfaces of the first electrode or the second electrode. Furthermore, the first electrode may include a first uncoated region in which a positive electrode active material is not included. The first uncoated region may extend beyond one side of the separator. Also, the second electrode may include a second uncoated region in which a negative electrode active material is not included. The second uncoated region may extend beyond the other side of the separator. That is, the first uncoated region and the second uncoated region may extend beyond the separator in opposite directions. This structure will be described below in more detail.

The can 120 includes two wide lateral surfaces 121a and 121b, two narrow lateral surfaces 122a and 122b, and one bottom surface 123. Also, the can 120 has an open upper portion. The electrode assembly 110 is placed into the can 120 together with an electrolyte. In the case, the first uncoated region and the second uncoated region of the electrode assembly 110 extend, respectively, toward one of the two narrow lateral surfaces 122a and 122b. The can 120 may be formed of a material such as aluminum, copper, iron, SUS steel, ceramic, and polymer, or equivalents thereof. However, the case may be formed of any suitable material. Furthermore, the can 120 may be electrically connected to one of the first electrode or the second electrode of the electrode assembly 110. That is, the can 120 may have a polarity, either positive or negative.

The first electrode terminal 130 and the second electrode terminal 140 are electrically connected to the first electrode and the second electrode of the electrode assembly 110, respectively. That is, the first electrode terminal 130 may be welded to the first electrode, and the second electrode terminal 140 may be welded to the second electrode. The first electrode terminal 130 may also be welded to a first metal plate 161 of the short circuit member 160 together with the first uncoated region of the first electrode. Also, the second electrode terminal 140 may be welded to a second metal plate 163 of the short circuit member 160 together with the second uncoated region of the second electrode. This structure will be described below in more detail.

Reference numerals 160a and 160b of FIG. 1B represent marks at which the first metal plate 161 of the short circuit member 160 may be welded to the first uncoated region of the first electrode of the electrode assembly 110. Reference numeral 160c represents marks at which the first metal plate 161 of the short circuit member 160 and the first uncoated region of the first electrode of the electrode assembly 110 may be welded to the first electrode terminal 130. Also, reference numerals 160d and 160e of the FIG. 1B represent marks at which the second metal plate 163 of the short circuit member 160 may be welded to the second uncoated region of the second electrode of the electrode assembly 110. Reference numeral 160f represents a mark at which the second metal plate 163 of the short circuit member 160 and the second uncoated region of the second electrode of the electrode assembly 110 may be welded to the second electrode terminal 140.

The first electrode terminal 130 includes a welding region 131, a first extension 132, a second extension 133, and a bolt extension 134. The welding region 131 is inserted into the first electrode of the electrode assembly 110, i.e., the first uncoated region. Also, the second electrode terminal 140 includes a welding region 141, a first extension 142, a second extension 143, and a bolt extension 144. The welding region 141 is inserted into the second electrode of the electrode assembly 110, i.e., the second uncoated region. In addition, each of the bolt extensions 134 and 144 of the first electrode terminal 130 and the second electrode terminal 140 passes through the cap plate 150 to protrude outside the case.

The cap plate 150 allows the first electrode terminal 130 and the second electrode terminal 140 to protrude outside the case, and also covers the can 120. Here, a boundary between the cap plate 150 and the can 120 may be welded using a laser. In addition, each of the bolt extensions 134 and 144 of the first electrode terminal 130 and the second electrode terminal 140 pass through the cap plate 150. Insulating materials 151a and 151b may be disposed on outer surfaces of the bolt extensions 134 and 144, respectively. Thus, the first electrode terminal 130 and the second electrode terminal 140 may be electrically insulated from the cap plate 150. In some cases, one of the first electrode terminal 130 and the second electrode terminal 140 may directly contact and pass through the cap plate 150 without requiring the insulating material 151a or 151b. For example, if the bolt extension 134 of the first electrode terminal 130 is not covered by the insulating material 151, the bolt extension 134 of the first electrode terminal 130 may directly contact the cap plate 150. In this case, the cap plate 150 and the can 120 have the same polarity as the first electrode terminal 130.

Nuts 135 and 145 are coupled to the bolt extensions 134 and 144 of the first electrode terminal 130 and the second electrode terminal 140, respectively. Thus, the first electrode terminal 130 and the second electrode terminal 140 are firmly fixed to the cap plate 150. Furthermore, an electrolyte plug 152 may be coupled to the cap plate 150. A safety vent 153 having a relatively thin thickness may be included on the cap plate 150. The cap plate 150 may be formed of the same material as the can 120.

The short circuit member 160 is between the electrode assembly 110 and the can 120, and thus is firstly short circuited when the secondary battery 100 is punctured or collapsed. Since the short circuit member 160 is electrically connected to the electrode assembly 110, the short circuit member short circuits the entire electrode assembly.

The short circuit member 160 is wound about one to seven times around the electrode assembly 110. When the short circuit member 160 is wound around the electrode assembly 110 less than one time, the short circuit member 160 may not be cause a short circuit when the secondary battery 100 is punctured or collapsed because the short circuit member 160 does not cover the entire electrode assembly 110. In other words, the puncture or collapse could occur at a place where the short circuit member is not present. Also, when the short circuit member 160 is wound around the electrode assembly 110 more than seven times, the electrode assembly 110 may not be inserted into the can 120 because the electrode assembly 110 is too big. As a result, in order to insert an electrode assembly 110 that includes a short circuit member 160 than has been wound around the electrode assembly 110 more than seven times, the electrode assembly 110 is reduced in size, reducing the capacity of the secondary battery 100.

Also, the short circuit member 160 includes the first metal plate 161, a first film, the second metal plate 163, and a second film 164. A portion of the first metal plate 161 extends beyond an end of the first film, and is electrically connected to the first uncoated region of the first electrode of the electrode assembly 110. Also, a portion of the second metal plate 163 is exposed beyond the other end of the second film, and is electrically connected to the second uncoated region of the second electrode of the electrode assembly 110. That is, the first metal plate 161 extends in an opposite direction to that of the second metal plate 163. As described above, the first metal plate 161 is electrically connected to the first electrode terminal 130 through the first uncoated region of the first electrode, and the second metal plate 163 is electrically connected to the second electrode terminal 140 through the second uncoated region of the second electrode.

The first film is not illustrated in FIGS. 1B and 1C. The coupling relation between the short circuit member 160 and the electrode assembly 110 will be described below in more detail.

Figure 2A:
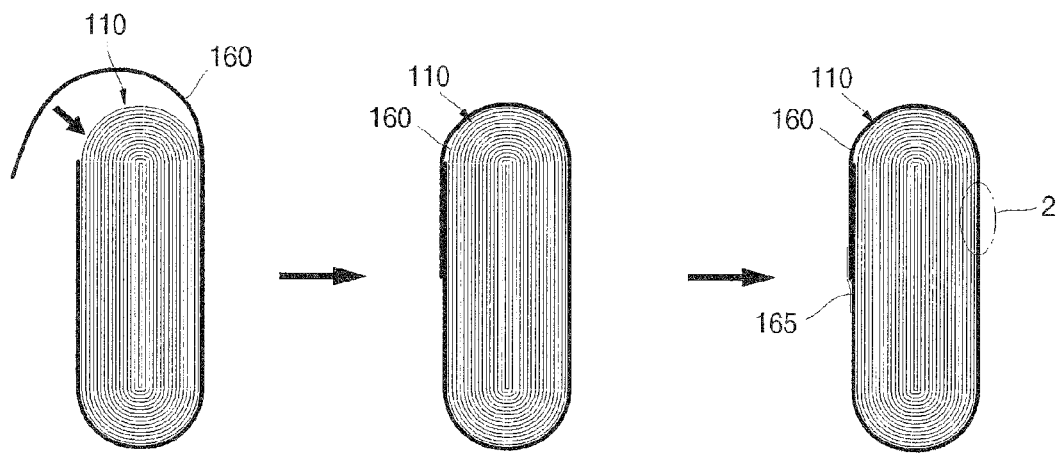
FIG. 2A illustrates a process in which a short circuit member is wound around an electrode assembly in a secondary battery according to an exemplary embodiment of the present invention.
Figure 2B:
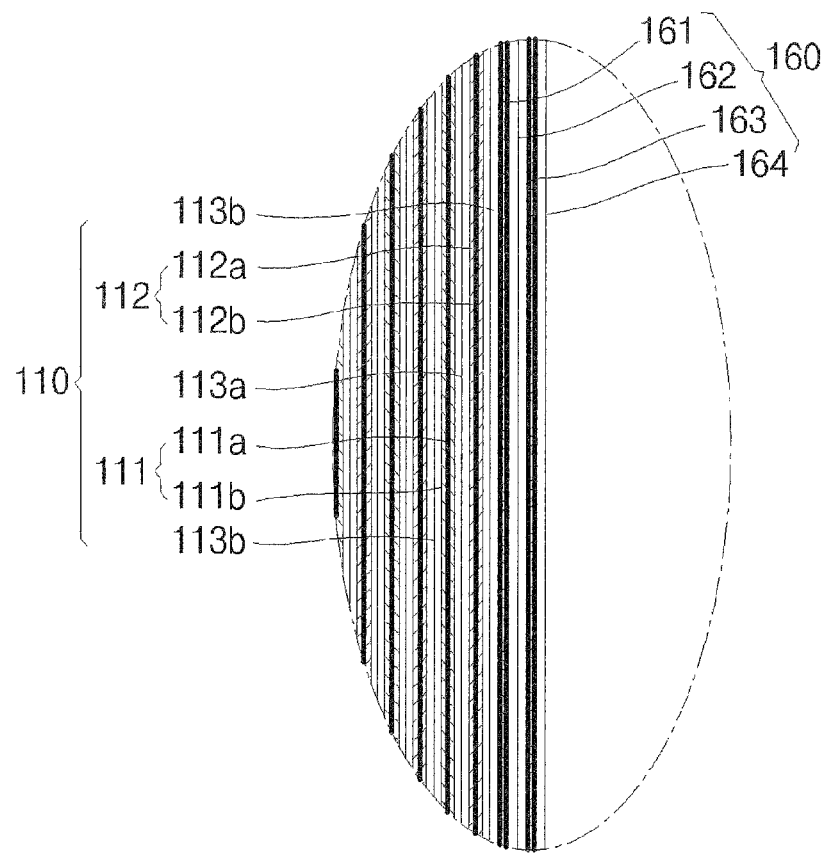
FIG. 2B illustrates an enlarged view of region 2 of FIG. 2A.

FIG. 2A illustrates a process in which a short circuit member is wound around an electrode assembly in a secondary battery, and FIG. 2B illustrates an enlarged view of region 2 of FIG. 2A.

Referring to FIG. 2A, the separate short circuit member 160 may be provided and wound around the electrode assembly 110. That is, the short circuit member 160 may be provided using a manufacturing process different from a process for manufacturing the electrode assembly 110 and separately wound around the electrode assembly 110. In other words, the short circuit member 160 does not extend from, and is not integral with, the electrode assembly 110. In addition, after the short circuit member 160 is wound, a sealing tape 165 is adhered to prevent the short circuit member 160 from being loosed from the electrode assembly 110.

Referring to FIG. 2B, the short circuit member 160 includes the first metal plate 161 attached to the electrode assembly 110, the first film 162 attached to the first metal plate 161, the second metal plate 163 attached to the first film 162, and the second film 164 attached to the second metal plate 163.

The first metal plate 161 and the second metal plate 163 may be made of the same material as the first metal foil 111a and the second metal foil 112a. That is, the first metal plate 161 and the second metal plate 163 may each include aluminum foils, respectively. The first metal plate 161 and the second metal plate 163 may each include copper foils, respectively. The first metal plate 161 may include an aluminum foil, and the second metal plate 163 may include a copper foil. The first metal plate 161 may include a copper foil, and the second metal plate 163 may include an aluminum foil. In embodiments of the present invention, the first metal plate 161 and the second metal plate 163 may be formed of a material different from that of the can 120. For example, when the can 120 is formed of aluminum, the first metal plate 161 and the second metal plate 163 may be formed of a copper material, and vice versa. When the first metal plate 161 and the second metal plate 163 are formed of copper, the short circuit member 160 has good short circuit capability because copper has a lower resistivity than aluminum.

The first metal plate 161 and the second metal plate 163 may individually have thicknesses relatively greater than the thickness of the first metal foil 111a or the second metal foil 112a. For example, the first metal plate 161 and the second metal plate 163 may have a thickness ranging from about 100 μm to about 200 μm. When the first metal plate 161 and the second metal plate 163 have a thickness of less than 100 μm, short circuit characteristics may be poor when the secondary battery 100 is punctured or collapsed. Also, when the first metal plate 161 and the second metal plate 163 have a thickness of greater than 200 μm, the capacity of the secondary battery 100 is reduced because the electrode assembly is decreased in size to fit in the case. The first metal plate 161 and the second metal plate 163 may each include a single sheet or several stacked sheets. For example, the first metal foil 111a or the second metal foil 112a may be stacked to form the first metal plate 161 or the second metal plate 163. This does not mean, however, that the first metal plate 161 or the second metal plate 163 extend from the first electrode 111 or the second electrode 112. Rather, the first metal plate 161 and the second metal plate 163 are separate from the first electrode 111 and the second electrode 112.

The first film 162 and the second film 164 may be formed of porous PE or PP, but may also be formed of any suitable material. The first film 162 and the second film 164 may be formed of the same material as the separator.

As illustrated in FIG. 2B, for example, the electrode assembly 110 includes the first electrode 111 including a first metal foil 111a (e.g., aluminum foil) and a first active material 111b (e.g., lithium-based oxide). Also, the electrode assembly 110 includes the second electrode 112 including a second metal foil 112a (e.g., copper foil) and a second active material 112b (e.g., graphite). Separators 113a and 113b formed of PP or PE are disposed on both upper and lower surfaces of the first electrode 111, respectively. Also, the separators 113a and 113b may be on both upper and lower surfaces of the second electrode 112. Thus, the separator 113b is between the second electrode 112 disposed at the outermost periphery of the electrode assembly 110 and the first metal plate 161 of the short circuit member 160. That is, the first metal plate 161 is electrically insulated from the second electrode 112.

According to the secondary battery 100 having the above-described structure, the first film 162 of the short circuit member 160 may be torn to short circuit the first metal plate 161 to the second metal plate 163 when the secondary battery 100 is punctured or collapsed. As a result, since the first metal plate 161 is electrically connected to the first electrode 111, and the second metal plate 163 is electrically connected to the second electrode 112, the secondary battery 100 is short circuited. In addition, since the first metal plate 161 and the second metal plate 163 of the short circuit member 160 have low resistivity or are formed without nonconductive active materials, the first metal plate 161 and the second metal plate 163 generate almost no heat and consume a large amount of current. That is, the secondary battery 100 generates very little heat and quickly removes electric energy when puncture or collapsed. For example, the secondary battery 100 according to an embodiment is not only maintained at a temperature ranging from about 50° C. to about 70° C., but also does not exceed the temperature range when the secondary battery 100 is punctured or collapsed. Also, when the secondary battery 100 is punctured or collapsed, the second film 164 of the short circuit member 160 may be torn to short circuit the second metal plate 163 to the can 120. Here, when the can 120 has conductivity and polarity opposite to that of the second metal plate 163, the short circuit effect is maximized. In addition, since the can 120 may be formed of a metal having low resistivity, the secondary battery 100 generates heat having a relatively low-temperature, and the electric energy of the secondary battery 100 is quickly removed.

Figure 3:
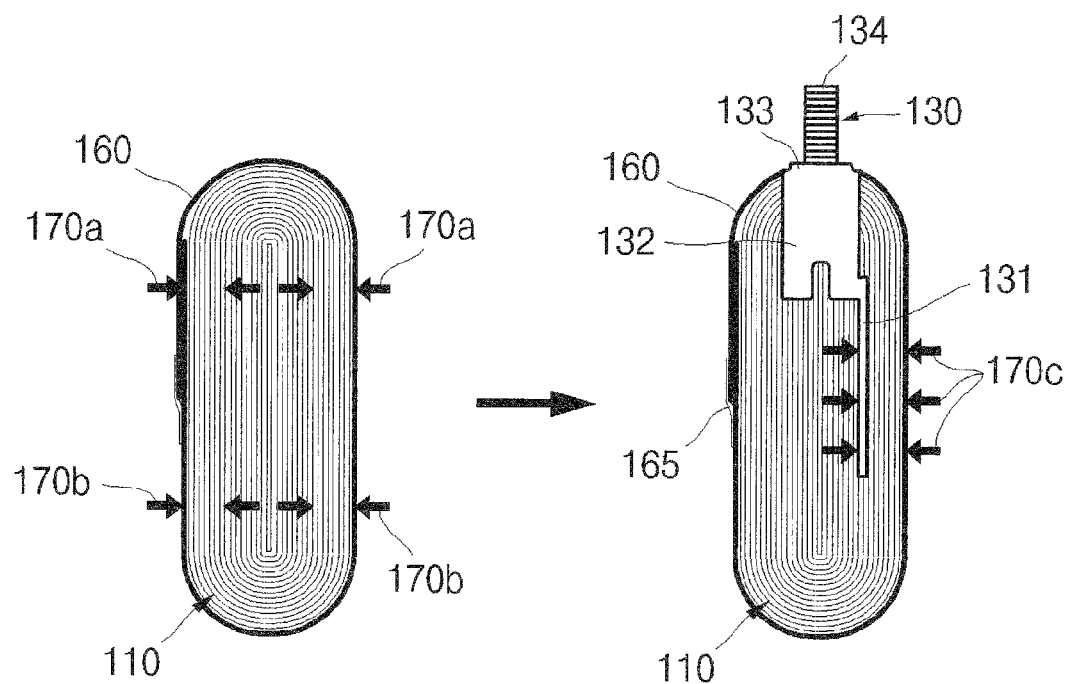
FIG. 3 illustrates a process in which an electrode assembly, a short circuit member, and an electrode terminal are welded to each other according to an exemplary embodiment of the present invention.

FIG. 3 illustrates a view of a process in which an electrode assembly, a short circuit member, and an electrode terminal are welded to each other in a secondary battery according to an embodiment of the present invention.

Referring to FIG. 3, the electrode assembly 110 and the short circuit member 160 separately wound on a surface of the electrode assembly 110 may be welded to each other in a plurality of regions. The welding process may include a resistance welding process, an ultrasonic welding process, and a laser welding process, but any suitable welding process may be used. Arrows 170a and 170b of FIG. 3 represent welding points between the electrode assembly 110 and the short circuit member 160.

Next, the electrode terminal 130 is coupled to the electrode assembly 110. That is, the welding region 131 of the electrode terminal 130 is coupled to the electrode assembly 110. More specifically, the welding region 131 of the first electrode terminal 130 is coupled to a gap defined in the first uncoated region of the electrode assembly 110, and a welding region 141 of the second electrode terminal 140 is coupled to a gap defined in the second uncoated region of the electrode assembly 110. Only the first electrode terminal 130 is illustrated in FIG. 3.

The welding region 131, the electrode assembly 110, and the short circuit member 160 may be welded to each other. That is, after the electrode assembly 110 and the short circuit member 160 are attached to the welding region 131 of the electrode terminal 130, the welding region 131, the electrode assembly 110, and the short circuit member 160 are welded to each other using general resistance welding, ultrasonic welding, or laser welding. However, any suitable welding method may be used. Reference numeral 170c of FIG. 3 represents a welding point between the welding region 131 of the electrode terminal 130, the electrode assembly 110, and the short circuit member 160.

Figure 4A:
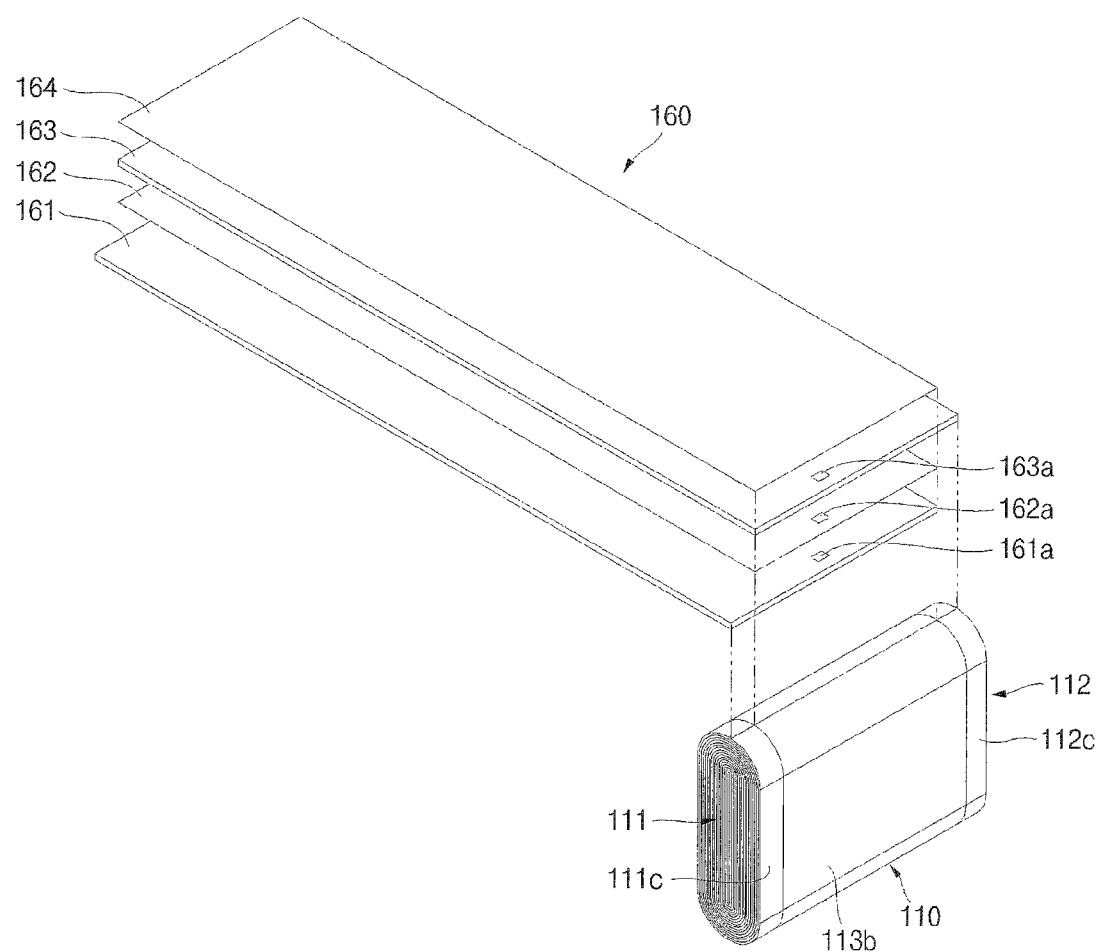
FIG. 4A is a perspective view of an electrode assembly of a secondary battery according to an exemplary embodiment of the present invention, where the short circuit member has not yet been wound around an electrode assembly.
Figure 4B:
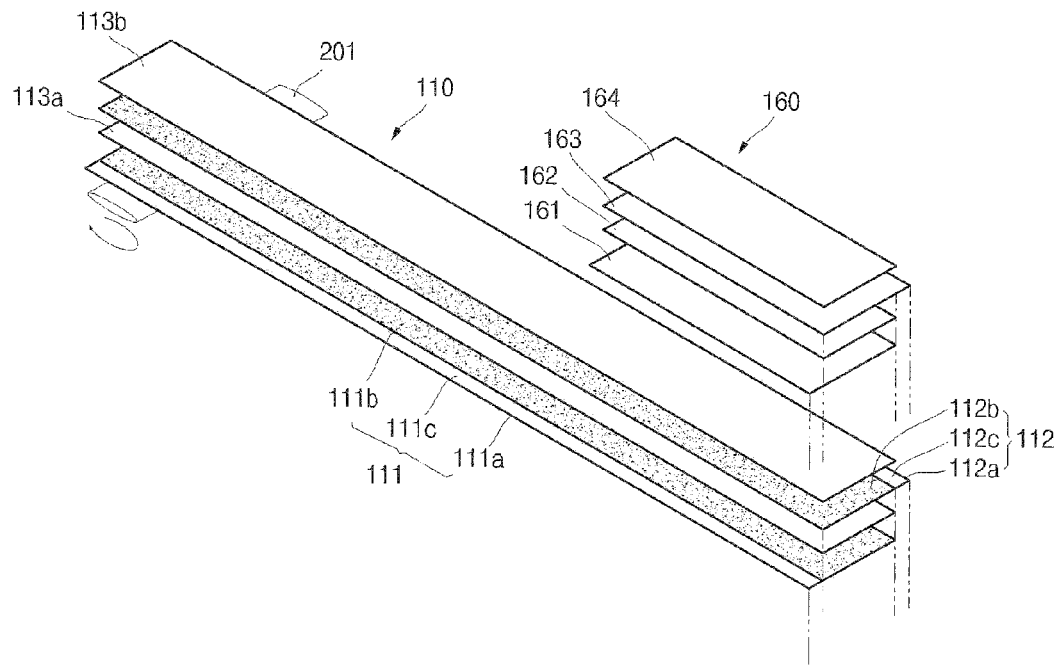
FIG. 4B is a perspective view of an electrode assembly and short circuit member of a secondary battery according to an exemplary embodiment of the present invention, where the electrode assembly and short circuit member have not yet been wound.

FIG. 4A is a perspective view of an electrode assembly of a secondary battery according to an exemplary embodiment of the present invention, where the short circuit member has not yet been wound around an electrode assembly, and FIG. 4B is a perspective view of an electrode assembly and short circuit member of a secondary battery according to an exemplary embodiment of the present invention, where the electrode assembly and short circuit member have not yet been wound.

Referring to FIG. 4A, in the completed electrode assembly 110, the first uncoated region 111c of the first electrode 111 protrudes beyond one side of the separator 113b. Also, the second uncoated region 112c of the second electrode 112 protrudes beyond the other side of the separator 113b. That is, the first uncoated region 111c protrudes in a direction opposite to that of the second uncoated region 112c. The separator 113b may be at the outermost periphery of the electrode assembly 110.

The short circuit member 160 includes the first metal plate 161, the first film 162, the second metal plate 163, and the second film 164. Here, the first metal plate 161 has a width similar to or equal to that of the first electrode 111. Also, the first metal plate 161 overlaps the first electrode 111. Thus, a region of the first metal plate 161 is connected to the first uncoated region 111c of the first electrode 111. The first metal plate 161 is not connected to the second uncoated region 112c of the second electrode 112. The first film 162 has a width less than that of the first metal plate 161. That is, the first film 162 has a width equal to that of the separator 113b. Furthermore, the first film 162 overlaps the separator 113b. Thus, the region of the first metal plate 161 protrudes beyond an end of the first film 162.

The second metal plate 163 has a width similar to or equal to that of the second electrode 112. Also, the second metal plate 163 overlaps the second electrode 112. Thus, a region of the second metal plate 163 is connected to the second uncoated region 112c of the second electrode 112. The second metal plate 163 is not connected to the first uncoated region 111c of the first electrode 111. The second film 164 has a width less than that of the second metal plate 163. That is, the second film 164 has a width equal to that of the separator 113b. Furthermore, the second film 164 overlaps the separator 113b. Thus, the region of the second metal plate 163 protrudes, beyond an end of the second film 164.

The short circuit member 160 having the above-described structure nearly or completely covers a surface of the electrode assembly 110. That is, short circuit member 160 is wound at least one to seven times around the electrode assembly 110. Thus, the first metal plate 161 of the short circuit member 160 is smoothly connected to the first uncoated region 111c of the first electrode 111 of the electrode assembly 110, and the second metal plate 163 is smoothly connected to the second uncoated region 112c of the second electrode 112 of the electrode assembly 110.

Reference numerals 161a, 162a, and 163a not described elsewhere denote adhesives. The adhesives prevent a plurality of components constituting the short circuit member 160 from being separated from each other when the short circuit member 160 is wound around the electrode assembly 110. That is, the adhesives prevent the first metal plate 161, the first film 162, the second metal plate 163, and the second film 164 from being separated from each other when the short circuit member 160 is wound around the electrode assembly 110.

In embodiments of the present invention, it is important that the active materials are absent from the first metal plate 161 and the second metal plate 163. Thus, when the secondary battery 100 is punctured or collapsed, the first film 162 may be torn to short circuit the first metal plate 161 to the second metal plate 163 in a wide region. In addition, the second film 164 may be torn to short circuit the second metal plate 163 to the can 120 in a wide region. Thus, a voltage of the secondary battery 100 is quickly dropped to about 0V, and energy stored in the secondary battery 110 is quickly consumed.

Referring to FIG. 4B, the electrode assembly 110 includes the first electrode 111, a second electrode 112, and the second separator 113b. The first electrode 111 includes the first metal foil 111a, the first active material 111b (e.g., lithium-based oxide), and the first uncoated region 111c. The second electrode 112 includes the first separator 113a, the second metal foil 112a, the second active material 112b (e.g., graphite), and the second uncoated region 112c. In addition, the first electrode 111, the first separator 113a, the second electrode 112, and the second separator 113b are stacked to form a stacked structure. An end of the stacked structure is coupled to a wind shaft 201 and wound several times to form a jelly roll type electrode assembly 110.

Referring again to FIG. 4B, since the first electrode 111 and the second electrode 112 have widths greater than those of the first separator 113a and the second separator 113b, the first uncoated region 111c extends beyond one side of the first separator 113a, and the second uncoated region 112c extends beyond the other side of the second separator 113b. As described above, the first metal plate 161 of the short circuit member 160 contacts the first uncoated region 111c, and the second metal plate 163 of the short circuit member 160 contacts the second uncoated region 112c.

As the first metal plate 161 and the second metal plate 163 constituting the short circuit member 160 each have one metal sheet, the first metal plate 161 and the second metal plate 163 may have thicknesses greater than that of at least the first electrode 111 or the second electrode 112 of the electrode assembly 110.

For ease of comprehension, the first electrode 111, the first separator 113a, the second electrode 112, and the separator 113b are represented in the drawings as having lengths less than their actual lengths.

Figure 5:
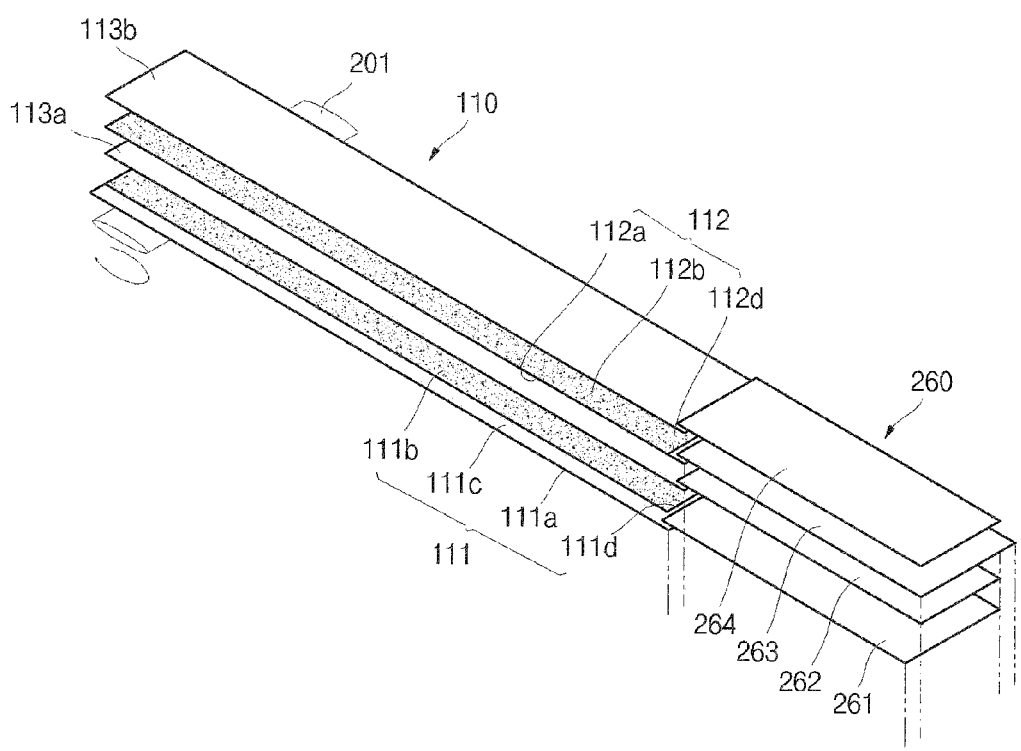
FIG. 5 is a perspective view of a short circuit member affixed to an electrode assembly of a secondary battery according to another exemplary embodiment of the present invention, where the electrode assembly and short circuit member have not yet been wound.

FIG. 5 is a perspective view of a short circuit member affixed to an electrode assembly of a secondary battery according to another exemplary embodiment of the present invention, where the electrode assembly and short circuit member have not yet been wound.

Referring to FIG. 5, a short circuit member 260 may contact, be connected, or be welded to each end, in a longitudinal direction, of a first electrode 111 and a second electrode 112, respectively. That is, a first metal plate 261 of the short circuit member 260 may be connected to an end 111d of the first electrode 111, on which a first active material 111b is not disposed, and the second metal plate 263 may be connected to an end 112d of the second electrode 112, on which a second active material 112b is not disposed. Also, a first film 262 may contact or be connected to an end, in a longitudinal direction, of a first separator 113a, and a second film 264 may contact or be connected to an end, in a longitudinal direction, of a second separator 113b.

Thus, the first metal plate 261 and the second metal plate 263 are electrically connected to a first uncoated region 111c and a second uncoated region 112c as well as the ends 111d and 112d of the first electrode 111 and the second electrode 112, respectively. As a result, electrical connection reliability between the short circuit member 260 and the electrode assembly 110 may be further improved.

Figure 6:
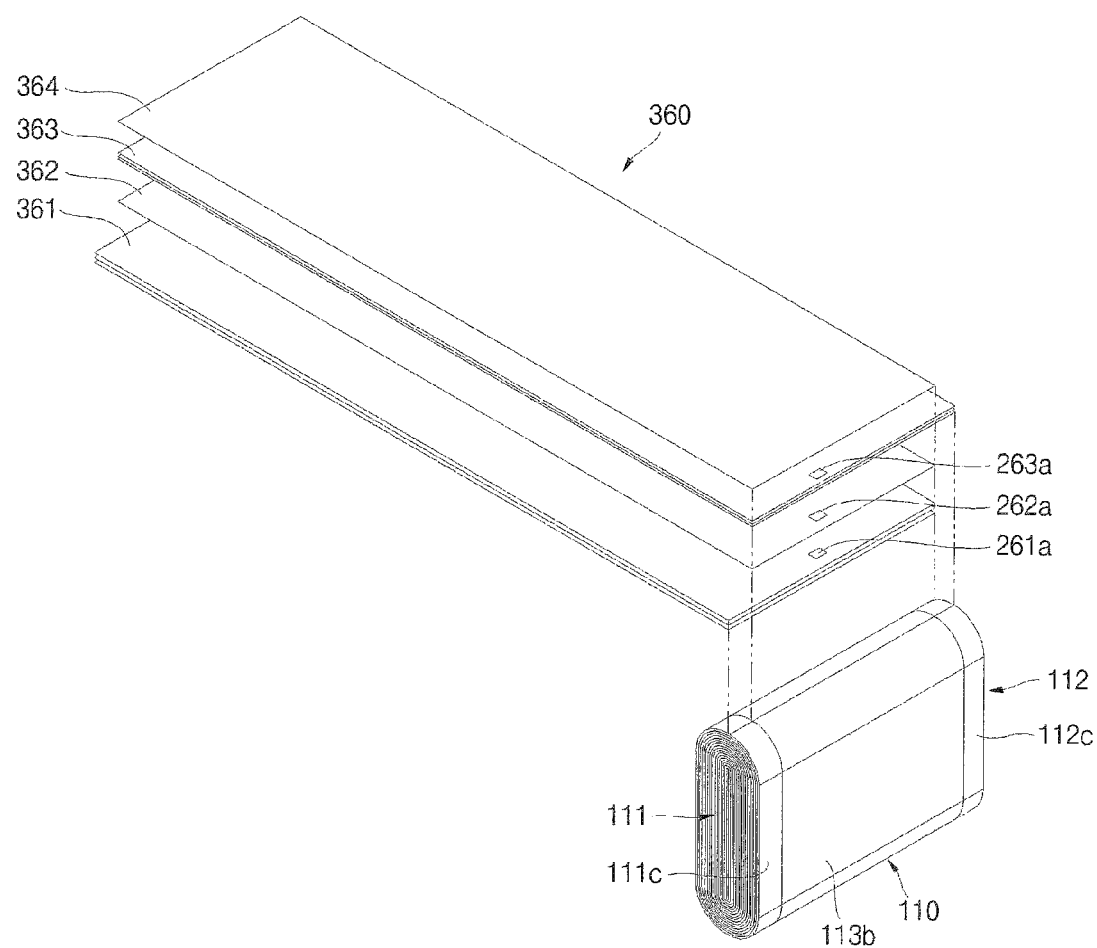
FIG. 6 is a perspective view of a perspective view of an electrode assembly of a secondary battery according to another exemplary embodiment of the present invention, where the short circuit member has not yet been wound around an electrode assembly.

FIG. 6 is a perspective view of a perspective view of an electrode assembly of a secondary battery according to another exemplary embodiment of the present invention, where the short circuit member has not yet been wound around an electrode assembly.

Referring to FIG. 6, a short circuit member 360 includes a multi-layered first metal plate 361 and a multi-layered second metal plate 363. A first film 362 is attached to the first metal plate 361, the second metal plate 363 is attached to the first film 362. A second film 364 is attached to the second metal plate 363. For example, a plurality of first metal foil sheets 111a are stacked to form the first metal plate 361. Also, a plurality of second metal foil sheets 112a are stacked to form the second metal plate 363. Thus, the short circuit member 360 may be more easily manufactured. That is, since the first metal foil 111a and the second metal foil 112a generally used for an electrode assembly 110 may be used instead of separate, thick first and second metal plates. Here, active materials are not disposed on the first metal plate 361 and the second metal plate 363. Reference numerals 261a, 262a, and 263a denote adhesives, similar to the adhesives 161a, 162a, and 163a shown in FIG. 4A.

Figure 7A:
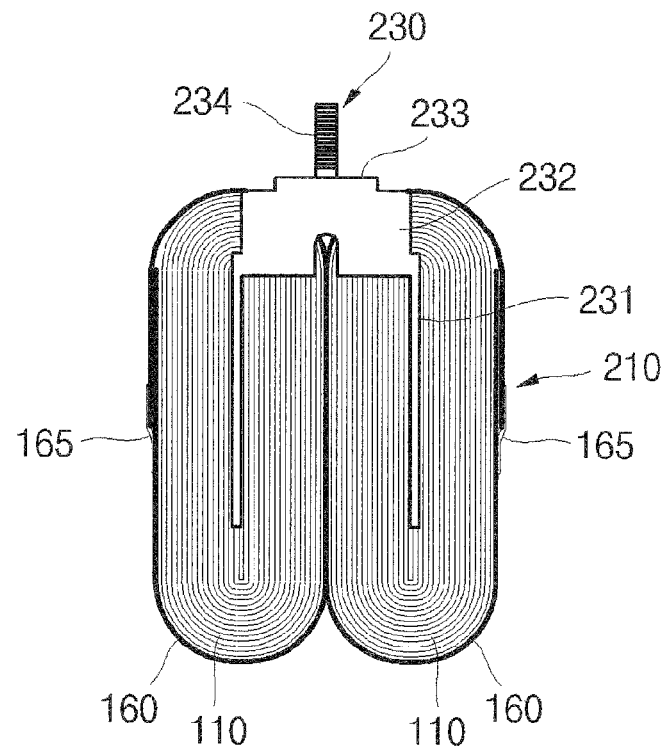
FIGS. 7A and 7B illustrate cross-sectional views of another exemplary embodiment of the present invention where there are two electrode assemblies.
Figure 7B:
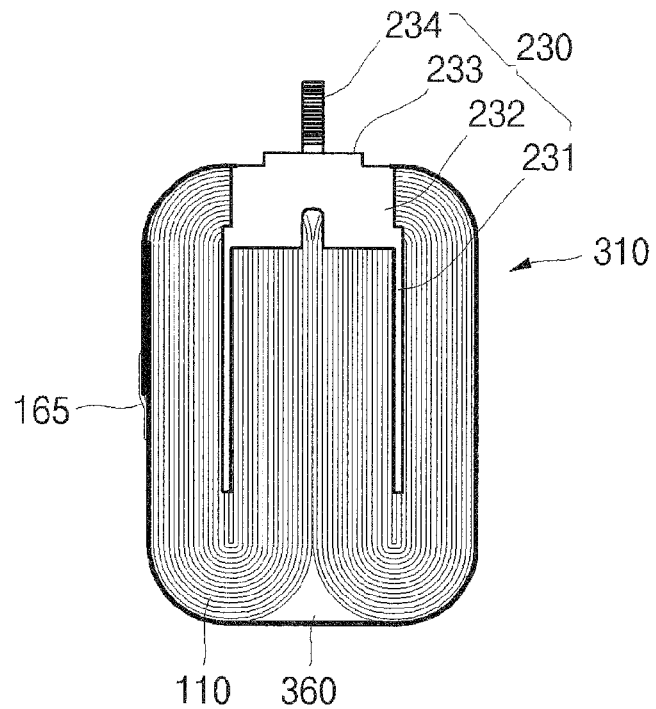

FIGS. 7A and 7B illustrate cross-sectional views of another exemplary embodiment of the present invention where there are two electrode assemblies.

Referring to FIG. 7A, an electrode assembly 210 may be provided in a pair 110. In addition, a short circuit member 160 may be independently wound around each of the electrode assemblies 110. Each of the electrode assemblies 110 is electrically connected to an electrode terminal 230. Here, the electrode terminal 230 includes two welding regions 231, a first extension 232, a second extension 233, and a bolt extension 234. Also, the welding regions 231 are inserted into each of the electrode assemblies 110. The short circuit member 160 and the electrode assemblies 110 are welded to the welding regions 231 using a typical welding method. As a result, the capacity of a secondary battery increases, and also, the secondary battery may be quickly and forcedly short circuited when the secondary battery is punctured or collapsed.

Referring to FIG. 7B, an electrode assembly 310 may be provided in a pair 110. Moreover, one short circuit member 360 may be integrally wound around the pair of electrode assemblies 110. That is, one short circuit member 360 completely covers the pair of electrode assemblies 110. Thus, the capacity of a secondary battery per volume increases, and also, the secondary battery may be quickly and forcedly short circuited. Furthermore, as the electrode assemblies 310 are completely covered by one short circuit member 360, the electrode assemblies 310 may be easily handled.

Figure 8A:
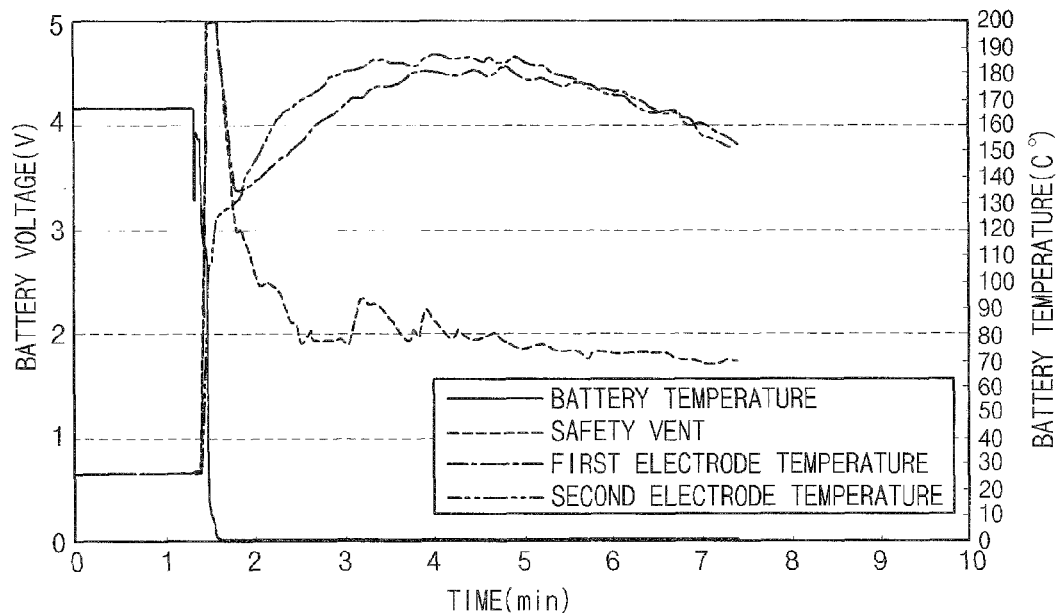
FIG. 8A is a graph of voltage-temperature characteristics of a secondary battery without a short circuit member that is punctured or collapsed.
Figure 8B:
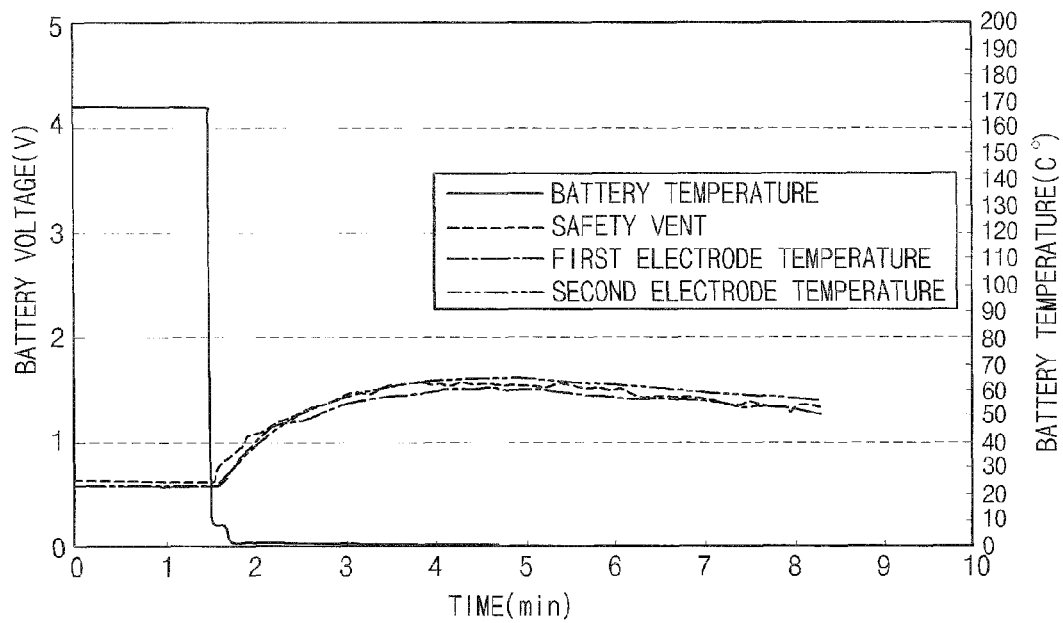
FIG. 8B is a graph of voltage-temperature characteristics when a secondary battery including a short circuit member is punctured or collapsed.

FIG. 8A is a graph of voltage-temperature characteristics of a secondary battery without a short circuit member that is punctured and collapsed, and FIG. 8B is a graph of voltage-temperature characteristics when a secondary battery including a short circuit member is punctured and collapsed.

In FIGS. 8A and 8B, the X-axis represents an elapsed time (in minutes). A left Y-axis represents a voltage (V), and a right Y-axis represents a temperature (° C.). Also, a test was performed under following conditions: an open circuit voltage is about 4.1 V, and a nail having a diameter of about 3 mm is penetrated into the secondary battery at a speed of about 80 mm/sec.

Referring to FIG. 8A, in a case of a secondary battery in which a short circuit member is not provided, after the penetration started, a voltage of the secondary battery was almost immediately dropped to about 0 V. Also, a safety vent and a first electrode terminal (positive terminal) exceeded a temperature of about 200° C., and then, dropped. Thereafter, the first electrode terminal and the second electrode terminal (negative terminal) were maintained at an elevated temperature of about 150° C. to about 190° C. for the remainder of the recorded time. Also, the safety vent was maintained at a temperature of about 70° C. to about 90° C. for the remainder of the recorded time. Therefore, in the case of the secondary battery in which the short circuit member is not provided, as the secondary battery exceeds a temperature of about 200° C. when the secondary battery is punctured and collapsed, the stability and reliability of the secondary battery are both poor.

Referring to FIG. 8B, in a case of a secondary battery in which a short circuit member is provided, after the penetration, a voltage of the secondary battery was almost immediately dropped to about 0 V. However, a safety vent, a first electrode terminal (positive terminal), and a second electrode terminal (negative terminal) did not exceed a temperature of about 50° C. to about 70° C. Therefore, in the case of the secondary battery in which the short circuit member is provided, as the secondary battery barely increases in temperature when the secondary battery is punctured and collapsed, the stability and reliability of the secondary battery are both superior to the stability and reliability of a battery without a short circuit member.

As described above, in the case of the secondary battery in which a short circuit member is not provided, it appears that the temperature excessively increases due to forced short circuiting of active materials, as the active materials have high resistivity or are nonconductive. That is, a large amount of heat is generated when current flows into a material having high resistivity. For example, graphite used as a negative active material has resistivity of about $7 \times 10^{-8}$ Ω·m to about $12 \times 10^{-6}$ Ω·m and lithium-based oxide used as a positive active material is almost nonconductive.

On the other hand, in the short circuit member according to an embodiment of the present invention, copper has resistivity of about $1.72 \times 10^{-8}$ Ω·m and aluminum has resistivity of about $2.75 \times 10^{-8}$ Ω·m. That is, copper and aluminum have significantly lower resistivity when compared to that of the graphite and lithium oxide. Thus, when the short circuit member formed of copper or aluminum material is short circuited, a large amount of current is consumed, and little heat is generated.

While this disclosure has been described in connection with what is presently considered to be practical exemplary embodiments, it is understood that the invention is not limited to the disclosed embodiments, but, on the contrary, is intended to cover various modifications and equivalent arrangements included within the spirit and scope of the appended claims.

What is claimed is:

1. A rechargeable battery comprising:
   a first electrode assembly comprising a first electrode, a second electrode, and a separator between the first electrode and the second electrode;
   a case containing the first electrode assembly;
   a cap plate coupled to the case;
   a short circuit member being electrically connected and welded to at least one of the first electrode or the second electrode at a first welding point;
   a first electrode terminal;
   a second electrode terminal; and
   a second electrode assembly inside the case,
   wherein the short circuit member is integrally wound around the first electrode assembly and the second electrode assembly,
   wherein the short circuit member comprises an electrically conductive material, and
   wherein the short circuit member is welded to both said first electrode or second electrode and to a corresponding one of the first electrode terminal or the second electrode terminal at a second welding point that is different from the first welding point, while the short circuit member at the first welding point is welded to only the at least one of the first electrode and the second electrode.

2. The rechargeable battery of claim 1, wherein a first end of the short circuit member overlaps a second end of the short circuit member.

3. The rechargeable battery of claim 1, wherein the short circuit member is wound around the first electrode assembly and the second electrode assembly between two to seven times.

4. A rechargeable battery comprising:
a first electrode assembly comprising a first electrode, a second electrode, and a separator between the first electrode and the second electrode;
a case containing the first electrode assembly;
a cap plate coupled to the case;
a short circuit member electrically connected and welded to the first electrode assembly at a first welding point, the short circuit member comprising a first metal plate, a second metal plate, and a first film between the first metal plate and the second metal plate;
a first electrode terminal; and
a second electrode assembly inside the case,
wherein the short circuit member is integrally wound around the first electrode assembly and the second electrode assembly,
wherein the short circuit member comprises an electrically conductive material, and
wherein the short circuit member is welded to both the first electrode assembly and to the first electrode terminal at a second welding point different from the first welding point, while the short circuit member at the first welding point is welded only to the first electrode assembly.

5. The rechargeable battery of claim 4, wherein the short circuit member is configured to short circuit the first and second electrode assemblies when the rechargeable battery is punctured or collapsed by electrically connecting the first metal plate and the second metal plate.

6. The rechargeable battery of claim 4, wherein the first metal plate is adjacent to the first electrode assembly, the second metal plate is adjacent to the case, and the short circuit member further comprises a second film located between the second metal plate and the case.

7. The rechargeable battery of claim 4, wherein the first metal plate is electrically connected to the first electrode, and the second metal plate is electrically connected to the second electrode.

8. The rechargeable battery of claim 4, wherein the first electrode comprises a metal foil, and wherein the first metal plate and the second metal plate comprise the same material as that of the metal foil.

9. The rechargeable battery of claim 4, wherein each of a resistivity of the first metal plate and a resistivity of the second metal plate is lower than that of an active material of the first electrode or that of an active material of the second electrode.

10. The rechargeable battery of claim 4, wherein the first metal plate and the second metal plate comprise copper.

11. The rechargeable battery of claim 4, wherein the first metal plate comprises aluminum and the second metal plate comprises copper.

12. The rechargeable battery of claim 4, wherein the first metal plate and the second metal plate comprise a different material than that of the case.

13. The rechargeable battery of claim 4, wherein each of the first metal plate and the second metal plate have a thickness between about 100 µm and about 200 µm.

14. The rechargeable battery of claim 4, wherein each of the first metal plate and the second metal plate have a multi-layered structure.

15. The rechargeable battery of claim 4, wherein the first electrode comprises a first metal foil, the second electrode comprises a second metal foil, and each of the first metal plate and the second metal plate have a thickness greater than that of the first metal foil or that of the second metal foil.

16. The rechargeable battery of claim 4, wherein the first electrode comprises a first uncoated region extending to a first side of the first electrode assembly, the second electrode comprises a second uncoated region extending to a second side of the first electrode assembly, the first metal plate is electrically connected to the first uncoated region, and the second metal plate is electrically connected to the second uncoated region.

17. The rechargeable battery of claim 16, wherein the first metal plate and the first uncoated region are welded to each other, and the second metal plate and the second uncoated region are welded to each other.

18. The rechargeable battery of claim 4, further comprising a second electrode terminal, wherein the first electrode comprises a first uncoated region extending to a first side of the first electrode assembly, wherein the second electrode comprises a second uncoated region extending to a second side of the first electrode assembly, wherein the first metal plate, the first uncoated region, and the first electrode terminal are electrically connected, and wherein the second metal plate, the second uncoated region, and the second electrode terminal are electrically connected.

19. The rechargeable battery of claim 4, wherein the first electrode is electrically connected to the case, and
wherein the short circuit member is configured to short circuit the first and second electrode assemblies when the rechargeable battery is punctured or collapsed by electrically connecting the second metal plate and the case.

* * * * *